(12) United States Patent
Itou

(10) Patent No.: US 7,047,812 B2
(45) Date of Patent: May 23, 2006

(54) PRESSURE REGULATOR WITH GAUGE EMBEDDED HANDLE

(75) Inventor: Ishinori Itou, Ibaraki (JP)

(73) Assignee: SMC Corporation, Tokyo (JP)

( * ) Notice: Subject to any disclaimer, the term of this patent is extended or adjusted under 35 U.S.C. 154(b) by 239 days.

(21) Appl. No.: 10/858,101

(22) Filed: Jun. 1, 2004

(65) Prior Publication Data

US 2004/0237656 A1 Dec. 2, 2004

(30) Foreign Application Priority Data

Jun. 2, 2003 (JP) .......................... 2003-156202

(51) Int. Cl.
*G01L 7/00* (2006.01)

(52) U.S. Cl. ............................................ 73/714
(58) Field of Classification Search .............. 417/222.2, 417/213, 269, 295; 62/228.3; 137/613, 495, 137/220, 505.18, 505.25, 454.6, 596.12, 137/625.23, 615.24; 73/714, 756; 210/131
See application file for complete search history.

(56) References Cited

U.S. PATENT DOCUMENTS

| | | | | | |
|---|---|---|---|---|---|
| 3,936,379 | A | * | 2/1976 | McCabe | 210/131 |
| 4,109,682 | A | * | 8/1978 | Gudjonsson | 137/625.23 |
| 4,516,600 | A | * | 5/1985 | Sturman et al. | 137/495 |

* cited by examiner

*Primary Examiner*—William Oen
(74) *Attorney, Agent, or Firm*—Hisako Muramatsu, Esq.

(57) ABSTRACT

An object of the present invention is to almost completely prevent relative rotation between a pressure gauge and valve main bodies. A gear D is fixed to a pressure gauge guide connected to the pressure gauge. A gear A having the same axis as the gear D is fixed to the valve bodies. A support shaft is rotatably inserted into an insertion hole at a non-center position of a bottom portion of a pressure adjustment guide. Gears C, B fixed to both ends of the support shaft are engaged with the gears D, A. The pressure gauge does not rotate relative to the valve main bodies when a handle is rotated.

7 Claims, 4 Drawing Sheets

PRESSURE REGULATOR WITH GAUGE EMBEDDED HANDLE

BACKGROUND OF THE INVENTION

1. Field of the Invention

The present invention relates to a pressure regulator with gauge embedded handle in which a secondary fluid pressure is set by manipulating a handle having a cylindrical portion, and a pressure gauge is disposed in the handle.

2. Description of the Related Art

[Japanese Utility Model Document 1 and Japanese Patent Document 1]

Japanese Utility Model Document 1 (H04-45043) and Japanese Patent Document 1 (JP-A-2001-5534) disclose the pressure regulator in which a valve chamber is disposed between a primary port (supply port) and a secondary port (output port), a main valve body (supply valve body) in the valve chamber is biased toward a main valve seat (supply valve seat) by a valve spring (return spring), the main valve body is biased away from the main valve seat by a pressure adjustment spring mounted between a feedback member (diaphragm) and a pressure adjustment spring retainer, a pressure gauge is disposed in a handle having a cylindrical portion, a feedback chamber between the feedback member and the valve chamber is in communication with the pressure gauge via a pressure introduction communication passage, and the handle adjusts an axial position of the pressure adjustment spring.

In the related art 1 (Japanese Utility Model Document 1), to almost perfectly prevent the pressure gauge from rotating relative to a bonnet of the valve main body even when the handle is rotated, a polygonal guide rod of a lower portion of an mount member is engaged with a polygonal hole at a lower end of a pressure adjustment nut which does not rotate relative to the bonnet, so that the mount member is connected to, but does not rotate relative to the pressure gauge. However, the machining cost of this guide rod is quite costly. Additionally, there is a slight clearance between the guide rod and the polygon-shaped hole. When a rotational direction of the handle is reversed, an angle is generated due to the slight clearance at the beginning of the reversal, and the pressure gauge rotates by the angle in a rotational direction of the handle. After that, the pressure gauge does not rotate even when the handle rotates. In other words, the pressure gauge rotates slightly relative to the bonnet at the beginning of the reversal, and this relative rotation is conducted to the handle to provide vibration to hands.

In the related art 1, an introduction passage, through which a pressure in the feedback chamber is introduced to the pressure gauge, is comprised of a pressure introduction hole and a passage, the hole running from a feedback chamber to inner walls of the valve body and bonnet, the passage running in the pressure adjustment screw, mount member, and pressure gauge guide. To airproof the passage from the pressure introduction hole to the pressure adjustment screw and the passage from the mount member passage to the pressure gauge guide, two O-rings need to be disposed between an inner peripheral surface of the bonnet and an outer peripheral surface of the pressure adjustment screw, and two O-rings need to be disposed between an inner peripheral surface of the pressure adjustment screw and an outer peripheral surface of the mount member. Additionally, one O-ring needs to be disposed between an outer peripheral surface of the pressure gauge guide and an inner peripheral surface of the hole of the mount member. Accordingly, the friction when the handle is rotated becomes large to require a large force for manipulating the handle.

In the related art 2 (Patent Document 1), as not described clearly, an indicator, a scale plate, and a pressure range indicator are provided for the pressure gauge. The pressure range indicator is mounted movably to be held at a desired position. A pressure gauge cover is fixed to the pressure gauge. The indicator, scale plate, and pressure range indicator are covered by the pressure gauge cover. Because the pressure gauge cover is fixed to the pressure gauge, and mounted in the handle, it cannot be detached when the pressure gauge is in the handle. Accordingly, to move the pressure range indicator, the pressure gauge needs to be taken out from the handle, and disassembled to detach the pressure gauge cover.

SUMMARY OF THE INVENTION

In a pressure regulator with gauge embedded handle, a first object of the present invention is to almost completely prevent relative rotation between a pressure gauge and valve main body, a second object of the present invention is to reduce a force for manipulating a handle by reducing the number of O-rings used in rotation members which are part of members for introducing a pressure in a feedback chamber to the pressure gauge, a third object of the present invention is to reduce cost by using no mount member, and a forth object of the present invention is to move a pressure range indicator by detaching a pressure gauge cover without taking out the pressure gauge from the handle.

To achieve the objects of the present invention, a first aspect of the pressure regulator is as follows. A valve chamber is disposed between a primary port and a secondary port in a valve main body. A main valve body in the valve chamber is biased by a valve spring toward a main valve seat, and biased away from the main valve seat by a pressure adjustment spring mounted between a feedback member and a pressure adjustment spring retainer. A pressure gauge is disposed in a handle having a cylindrical portion. A feedback chamber disposed between the feedback member and the valve chamber is in communication with the pressure gauge via an introduction communication passage.

Additionally, a pressure adjustment guide is connected to an inside of the handle so as not to rotate relative to the handle, a cylindrical portion of a pressure adjustment screw is fitted to a bottom center hole of the pressure adjustment guide so that the pressure adjustment guide and the pressure adjustment screw are connected to, but do not rotate relative to each other. A male screw portion of the pressure adjustment screw is engaged with a female screw portion of the pressure adjustment spring retainer. A gear D is fixed to the pressure gauge guide connected to the pressure gauge. A gear A having the same axis as the gear D is fixed to the valve main body. A support shaft is rotatably inserted into an insertion hole at a non-center position of the bottom portion of the pressure adjustment guide. Gears B, C, which are fixed to both ends of a support shaft, are engaged with the gears D, A. The pressure gauge does not rotate relative to the valve main body when the handle is rotated.

A second aspect of the present invention is as follows. In the first aspect, when the number of teeth of the gears A, B, C, D is $Z_A$, $Z_B$, $Z_C$, $Z_D$, respectively, a condition of $Z_A \cdot Z_C = Z_B \cdot Z_D$ is satisfied.

A third aspect of the pressure regulator of the present invention is as follows.

A valve chamber is disposed between a primary port and a secondary port in a valve main body. A main valve body in the valve chamber is biased by a valve spring toward a main valve seat, and biased away from the main valve seat by a pressure adjustment spring mounted between a feedback member and a pressure adjustment spring retainer. A pressure gauge is disposed in a handle having a cylindrical portion. A feedback chamber disposed between the feedback member and the valve chamber is in communication with the pressure gauge via an introduction communication passage.

Additionally, a pressure adjustment guide is connected to an inside of the handle so as not to rotate relative to the handle. A cylindrical portion of a pressure adjustment screw is fitted to a bottom center hole of the pressure adjustment guide so that the pressure adjustment guide and the pressure adjustment screw are connected to, but do not rotate relative to each other. A male screw portion of the pressure adjustment screw is engaged with a female screw portion of the pressure adjustment spring retainer.

A pressure gauge guide is connected to the pressure gauge. A guide portion of the pressure gauge guide is rotatably inserted into an insertion hole (inside the cylindrical portion) of the pressure adjustment screw. A space between an outer periphery of the guide portion and an inner periphery of the insertion hole is airproofed by an O-ring. An inside of the pressure gauge is in communication with the insertion hole via a communication hole of the pressure gauge guide. A lateral hole is formed to the pressure adjustment screw to communicate between the insertion hole and an outer periphery of the pressure adjustment screw. A pair of seal members are disposed between the outer periphery of the pressure adjustment screw and an inner periphery of a small diameter hole of the valve main body, and spaced from each other in a lateral direction of the pressure adjustment screw, so that an annular communication chamber is formed. The insertion hole is in communication with the annular communication chamber via the lateral hole. The annular communication chamber is in communication with the feedback chamber.

A fourth aspect of the present invention is as follows. In the third aspect, two annular grooves are formed to the outer periphery, and positioned laterally away from the lateral hole by a predetermined distance, and the seal members are disposed to the annular grooves.

A fifth aspect of the present invention is as follows. In the first and second aspects, the guide portion of the pressure gauge is rotatably inserted into the insertion hole (inside the cylindrical portion) of the pressure adjustment screw, the inside of the pressure gauge is in communication with the insertion hole via the communication hole of the pressure gauge guide, the lateral hole is formed to the pressure adjustment screw, and communicates between the insertion hole and the outer periphery, a pair of seal members are disposed between the outer periphery of the pressure adjustment screw and an inner periphery of a small diameter hole of the valve main body, and spaced from each other in a lateral direction of the pressure adjustment screw, so that an annular communication chamber is formed, the insertion hole is in communication with the annular communication chamber via the lateral hole, and the annular communication chamber is in communication with the feedback chamber.

A sixth aspect of the pressure regulator of the present invention is as follows. A valve chamber is disposed between a primary port and a secondary port in a valve main body. A main valve body in the valve chamber is biased by a valve spring toward a main valve seat, and biased away from the main valve seat by a pressure adjustment spring mounted between a feedback member and a pressure adjustment spring retainer. A pressure gauge is disposed in a handle having a cylindrical portion. A feedback chamber disposed between the feedback member and the valve chamber is in communication with the pressure gauge via an introduction communication passage.

An indicator, a scale plate, and a pressure range indicator are disposed to the pressure gauge. The pressure range indicator is movably mounted to be held at a desired position, and yet a window hole is formed to an upper end of the handle. A pressure gauge cover is detachably mounted to the window hole of the handle. The pressure range indicator is movable when the pressure gauge cover is detached.

A seventh aspect of the present invention is as follows. In the sixth aspect, engagement members and knobs having predetermined widths are fixed to both ends of a transparent plate of the pressure gauge cover, a hole with which the transparent plate is fixed and notches with which the engagement members and the knobs are fixed are formed to the window hole of the upper end of the handle, the hole and the notches being adjacent to each other, engagement projection portions are formed to an outer positions of the notches, engagement steps are formed inside upper portions of the engagement projection portions of the handle, and engagement step portions are formed outside upper portions of the engagement members of the pressure gauge.

In the present invention, "the pressure gauge guide having the gear D fixed thereto" includes the pressure gauge guide having the gear D integrated therewith, and "the valve main body having the gear A fixed thereto" includes the valve main body having the gear A integrated therewith. Additionally, "the gears C, B fixed to both ends of the support shaft" includes the gears C, B integrated with both ends of the support shaft. Further, the feedback member can be used as a diaphragm.

DETAILED DESCRIPTION OF THE PREFERRED EMBODIMENTS

Figure 1:
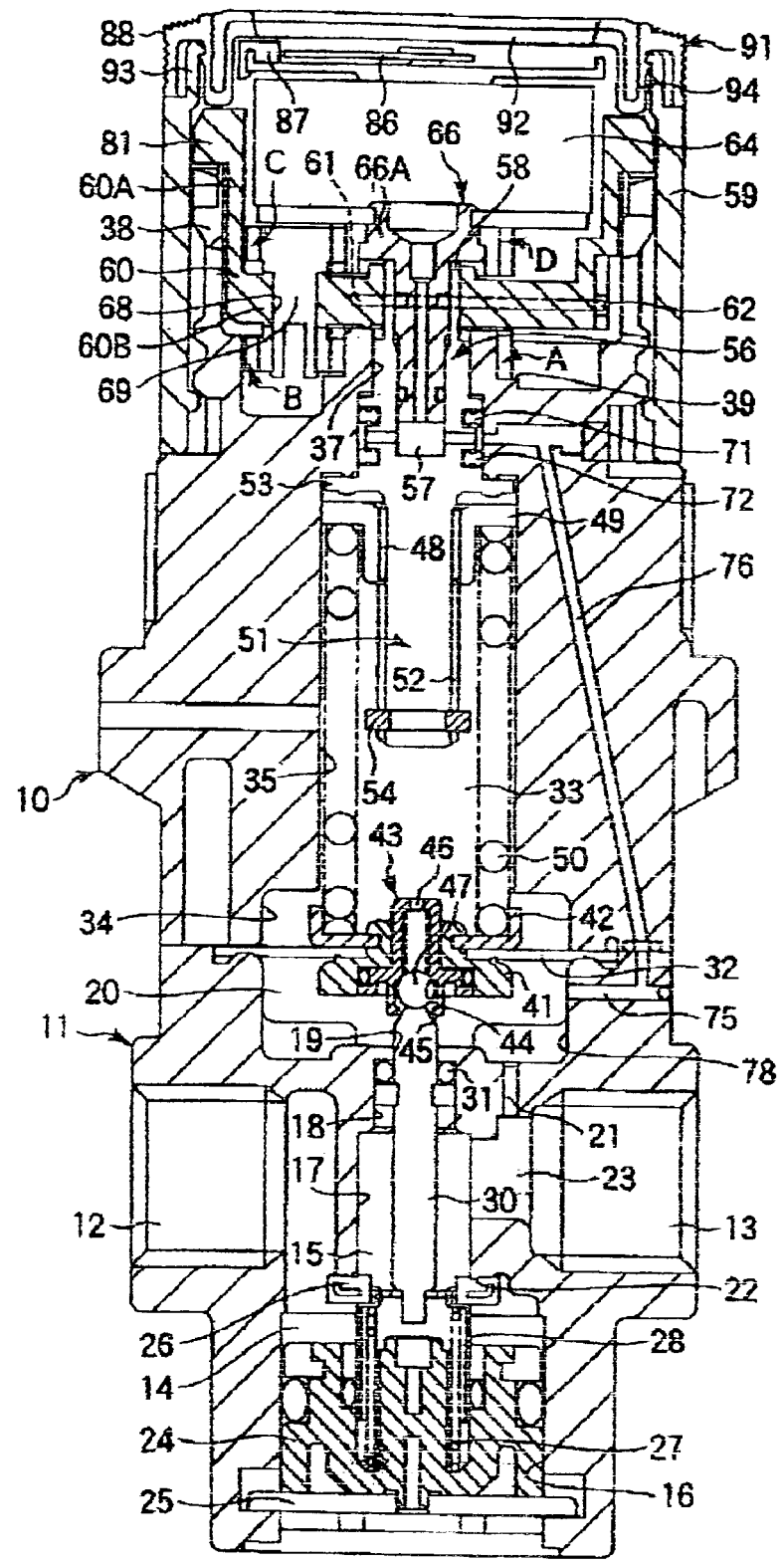
FIG. 1 shows a longitudinal section of embodiments of a pressure regulator with gauge embedded handle of the present invention.
Figure 2:
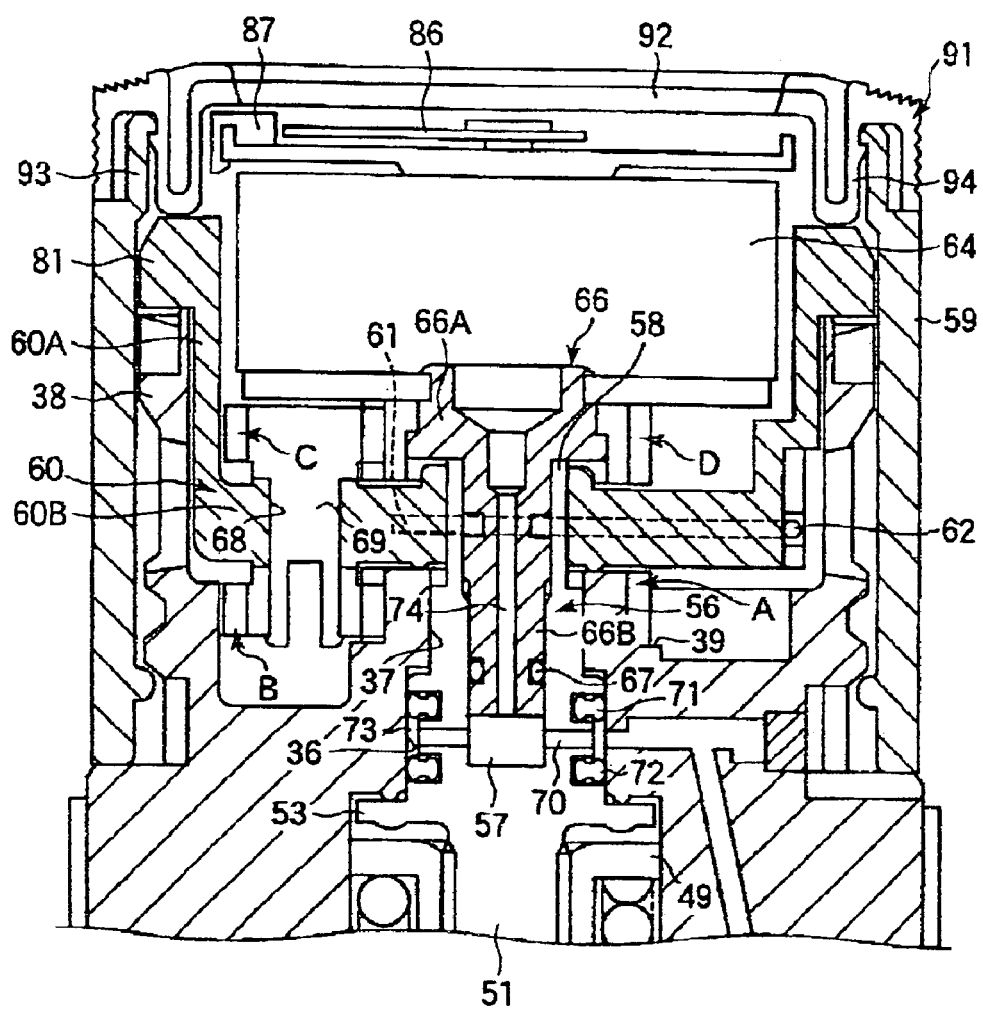
FIG. 2 is an enlarged view of a main part of FIG. 1.
Figure 3:
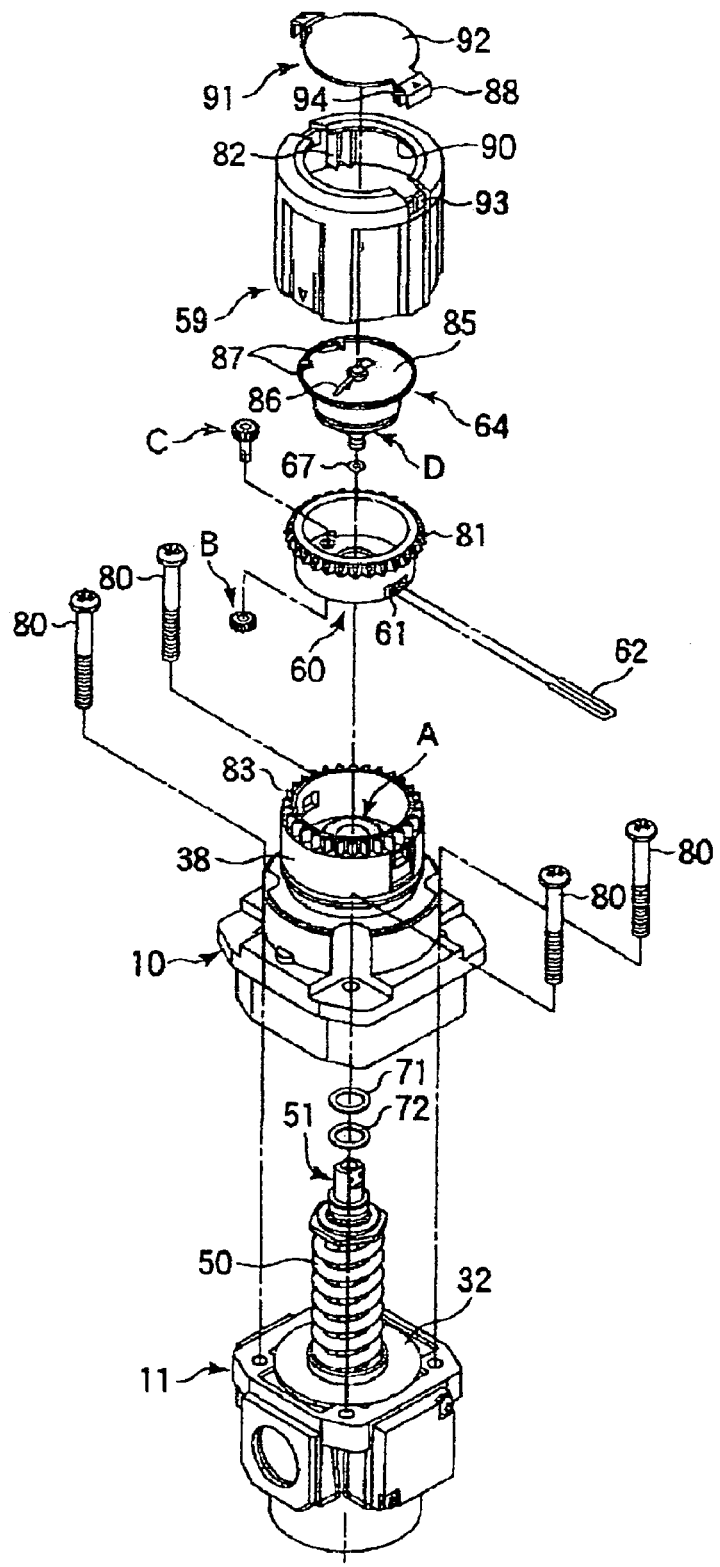
FIG. 3 is an exploded perspective view of the embodiments of the pressure regulator of the present invention.

FIGS. 1 to 4 shows embodiments of a pressure regulator with gauge embedded handle of the present invention. In the explanation of FIGS. 1 to 3, terms showing directions and positions are changed according to changes in an attitude of the pressure reduction valve.

The valve is comprised of a valve body 11 and bonnet 10 made of a metal or synthetic resin.

A primary port 12 and a secondary port 13 are formed opening to a side surface of the valve body 11. A valve chamber (primary pressure chamber) 14 and a secondary pressure chamber 15 are formed between the primary port 12 and secondary port 13. A large diameter hole 16, a middle diameter hole 17, a small diameter hole 18, an insertion hole 19, and a feedback chamber hole 78 are formed to a center portion of the valve body 11 from below. An upper side portion of the large diameter hole 16 is a valve chamber 14, which is in communication with the primary port 12. A valve seat 22 is formed to a lower end portion of the middle diameter hole 17, inside which a secondary pressure chamber 15 is formed. The secondary pressure chamber 15 is in communication with the secondary port 13 via a communication hole 23. A holder 24 is mounted to the large diameter hole 16 from a lower side of the large diameter hole 16, and is prevented from slipping out by use of a locking tool 25. A main valve body 26 is disposed between the main valve seat 22 and holder 24. A valve spring 27 is mounted between the main valve body 26 and holder 24. The main valve body 16 is biased by the valve spring 27 toward the main valve seat 22. A feedback chamber 20 in the feedback chamber hole 78 is in communication with the communication hole 23 via the communication hole 21.

A cylindrical body 28 extending downward is connected to the main body 26. A lower end portion of the cylindrical body 28 is slidably engaged with a lower outer peripheral wall of a stepped cylindrical bottom-closed hole of the holder 24. O-rings are mounted to spaces between the cylindrical body 28 and the holder 24 and between the holder 24 and the large diameter hole 16, so that the spaces are airproofed. A lower end of a stem 30 is inserted into a center hole of the main valve body 26. The stem 30 extends into the middle diameter hole 17, the small diameter hole 18, and the insertion hole 19. An upper end portion of the stem 30 projects into the feedback chamber 20. An O-ring 31 is mounted between the small diameter hole 18 and the stem 30, so that a space between an inner peripheral surface of the small diameter hole 18 and an outer peripheral surface of the stem 30 is airproofed. The upper end portion of the stem 30 has a truncated cone shaped tapered portion, on an upper end of which a spherical portion is formed. A bottom surface of the bonnet 10 is in contact with a top surface of the valve body 11. The valve body 11 and the bonnet 10 are connected to each other by use of, e.g., bolts 80. An outer peripheral portion of a feedback member (diaphragm) 32 is sandwiched by an inner peripheral portion of a contact surface between the top surface of the valve body 11 and the bottom surface of the bonnet 10. The feedback chamber 20 is under the feedback member 32. A spring chamber 33 is above the feedback member 32.

A large diameter hole 34, a middle diameter hole 35, a small diameter hole 36, and a bearing hole 37 are formed to a center portion of the bonnet 10 in order from a lower side of the bonnet 10. A thin-walled cylindrical portion 38 having a large diameter is formed to the upper end portion of the bonnet 10. A top surface 39 of the bonnet 10 is inside a lower end portion of the thin-walled cylindrical portion 38. An upwardly projecting portion of a shell 41 is inserted into a center hole of the feedback member 32 from below. A spring retainer 42, positioned above the feedback member 32, is fixed to the upwardly projecting portion. A valve seat body 43 is mounted to a stepped center hole of the shell 41 from below. A space between the stepped center hole and the valve seat body 43 is airproofed by an O-ring. A guide portion 45 having a cylindrical shape, a valve seat 44, a spring chamber, and a communication hole 46 are formed to a center portion of the valve seat body 43 in order from a lower side of the valve seat body 43. The guide portion 45 holds a spherical valve body 47. The spherical valve body 47 and the valve seat 44 form an exhaust valve. A spring is inserted into the spring chamber of the valve seat body 43. The sphere valve body 47 is biased by the spring away from the valve seat 44. A spherical portion of the upper end of the stem 30 is in contact with a lower side of the spherical valve body 47. The valve spring 27 biases the spherical valve body 47 toward the valve seat 44.

A pressure adjustment spring retainer 49 is held in the spring chamber 33 to move up and down and not to rotate. A pressure adjustment spring 50 is disposed between the pressure adjustment spring retainer 49 and the spring retainer 42. A pressure adjustment screw 51 is inserted into the middle diameter hole 35, small diameter hole 36, and bearing hole 37 of the bonnet 10. A male screw portion 52 is formed to a lower position of the pressure adjustment screw 51. A flange portion 53 is formed to an upper side of the male screw 52. A female screw portion 48 is formed to the pressure adjustment spring retainer 49. The male screw portion 52 of the pressure adjustment screw 51 is threadably engaged with the female portion 48. Therefore, the pressure adjustment screw 51 is biased upward by resilience of the pressure adjustment spring 50, and the flange portion 53 is pressed to a step portion between the middle diameter hole 35 and the small diameter hole 36. An annular groove is formed to a lower end of the screw portion 52. A stopper 54 is fitted to the annular groove to prevent the pressure adjustment spring retainer 49 from stepping out. A stepped cylindrical portion 56 is formed to an upper side of the pressure adjustment screw 51. An insertion hole 57 is inside the stepped cylindrical portion 56. In the insertion hole 57, an inner diameter of its upper half is rather larger than that of its lower half.

A handle 59 having a cylindrical portion is rotatably fitted outside the thin-walled cylindrical portion 38 on the upper end portion of the bonnet 10. A pressure adjustment guide 60 is positioned inside the handle 59 and thin-walled cylindrical portion 38. The pressure adjustment guide 60 is connected to, but do not rotate relative to the handle 59. The pressure adjustment guide 60 has a bottom-closed cylindrical shape, and has a cylindrical portion 60A and a bottom portion 60B. First outward-projecting engagement portions 81 (plural) project outward in the radial direction over the upper end of the thin-walled cylindrical portion 38, and are always engaged with engagement elements 82 (plural, see FIG. 3) projecting into an inner periphery of the upper portion of the handle 59. At a non-rotation position of the handle (lower position) shown in FIGS. 1, 2, the engagement elements 82 of the handle 59 are also engaged with second outward-projecting engagement portions 83 on the upper end portion of the thin-walled cylindrical portion 38 of the bonnet 10 (see FIG. 3), so that the handle 59 cannot be rotated. When the handle 59 is rotated, its rotation position is moved from its lower position to upper position to release the engagement between the engagement elements 82 and the second outward-projecting engagement portions 83 of the handle 59. A center portion of the top surface 39 of the bonnet 10 projects upward. Teeth are formed to an outer peripheral surface of the center portion to form a gear A. In FIGS. 1 to 3, the gear A is integrally formed (molded) to the bonnet 10. The gear A, in a separate form, may be fixed to the bonnet 10.

The upper half of the stepped cylindrical portion 56 of the pressure adjustment screw 51 is a cylindrical portion 58 having no step. The cylindrical portion 58 projects above the gear A. A center hole of the bottom portion 60B of the pressure adjustment guide 60 is fitted to the cylindrical portion 58. Two oblong insertion holes 61 are formed to the plane bottom portion 60B of the pressure adjustment guide 60 vertically to a paper of FIG. 1. An annular groove (or two parallel planes) is formed to an outer periphery of the cylindrical portion 58. Two foot portions of a clip 62, which are U-shaped, are inserted into the two oblong insertion holes 61, and are engaged with the annular groove, so that the pressure adjustment guide 60 and the pressure adjustment screw 51 are connected to, but do not rotate relative to each other. This state is briefly shown in FIGS. 1, 2. The clip 62 is not in contact with a pressure gauge guide 66, which is after-mentioned. The pressure gauge guide 66 is connected to a lower side of a pressure gauge 64. A flange portion 66A having a large diameter is formed to a proximal end portion (upper end portion). A guide portion 66B having a small diameter is formed adjacent to a lower side of the flange portion 66A. The guide portion 66B of the pressure gauge guide 66 is rotatably inserted into the insertion hole 57 of the pressure adjustment screw 51. In the guide portion 66B, an outer diameter of its lower half is smaller than that of its upper half. A space between an outer peripheral surface of the guide portion 66B and an inner peripheral surface of the insertion hole 57 is airproofed by an O-ring 67.

Figure 4:
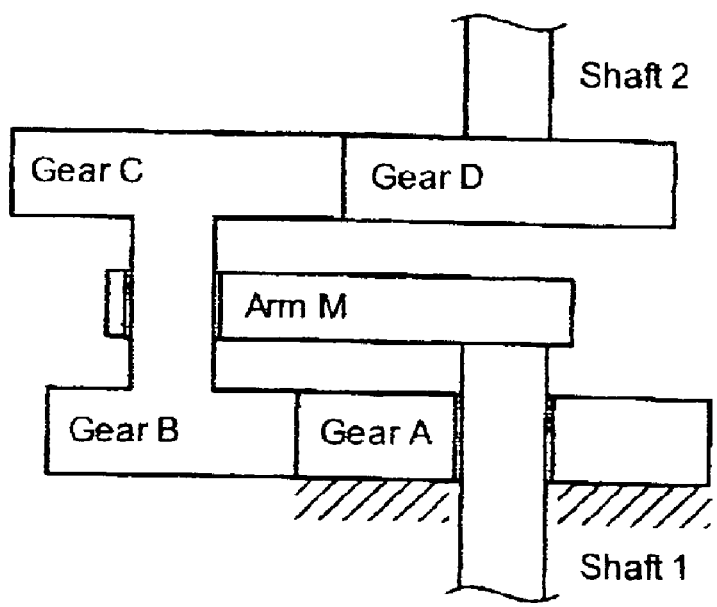
FIG. 4 shows a planet gear mechanism used in the embodiments of the present invention.

A gear D is fixed to a flange portion 66A of the pressure gauge guide 66 connected to the pressure gauge 64. A center line of the gear D is collinear with that of the gear A. In FIGS. 1 to 3, the gear D, which is separated from the pressure gauge guide 66, is fixed to the outer periphery of the flange portion 66A of the pressure gauge guide 66. The gear D may be integrally formed (molded) to the pressure gauge guide 66. An insertion hole 68 is formed to a non-center position (a position away from the center by a predetermined distance) of the bottom portion 60B of the pressure gauge guide 60. A support shaft 69 is rotatably inserted into the insertion hole 68. Gears C, B are fixed to upper and lower end portions of the support shaft 69 respectively, and engaged with the gears D, A respectively to form a planet gear mechanism. In FIGS. 1 to 3, the gear C is integrated with the support shaft 69, and the lower end portion of the support shaft 69 is fitted to, but does not rotate relative to a snap-fit hole of the gear B. In this planet gear mechanism, as shown in FIGS. 2, 4, the bottom portion 60B of the pressure adjustment guide 60 is an arm M. The gear C and gear B fixed to the support shaft 69 supported by a top end portion of the arm M are engaged with the gears D, A to rotate and to simultaneously revolve around the gears D, A. The gear A is fixed to the valve main body (bonnet 10) to be relatively at rest. A shaft 1 (on the side of the pressure adjustment screw 51) fixed to the arm M (on the side of the handle) is a driving shaft. A shaft 2 (on the side of the pressure gauge) is a driven shaft.

The number of teeth of the gears A, B, C, D are $Z_A$, $Z_B$, $Z_C$, $Z_D$, and the rotational frequency of the shafts 1, 2 are $n_1$, $n_2$. In this case, it is clear from knowledge of mechanics that the following equation shows relationship between the rotational frequency $n_2$ of the shaft 2 and the rotational frequency $n_1$ of the shaft 1.

$$n_2 = (1 - Z_A \cdot Z_C / Z_B \cdot Z_D) n_1$$

In this equation, when $Z_A \cdot Z_C / Z_B \cdot Z_D = 1$, in other words, when $Z_A \cdot Z_C = Z_B \cdot Z_D$, the rotational frequency $n_2$ is always zero regardless of the rotational frequency $n_1$, so that there is no relative rotation between the gear A (bonnet 10) and the rotation shaft 2 (the pressure gauge guide 66, the pressure gauge 64). In other words, to satisfy the above condition, the pressure gauge 64 and pressure gauge guide 66 (the shaft 2, the gear D) do not rotate relative to the valve main body, the bonnet 10, and the gear when the handle 59 and the pressure adjustment guide 60 (the arm M) are rotated.

In FIGS. 1 to 3, $Z_A = Z_D$ and $Z_B = Z_C$.

A lateral hole 70 is formed to the pressure adjustment screw 51. The lateral hole 70 communicates between the lower end portion of the insertion hole 57 and the outer peripheral surface of the pressure adjustment screw 51. A pair of seal members 71, 72 are disposed to a space between the outer peripheral surface of the pressure adjustment screw 51 and the inner peripheral surface of the bonnet 10 so that the space is airproofed. The seal members 71, 72 are spaced from each other in a direction lateral to the pressure adjustment screw 51. Concretely, two annular grooves are formed to the outer peripheral surface of the pressure adjustment screw 51. The two annular grooves are laterally (up and down) away from an opening of the lateral hole 70 by a predetermined distance. The seal members 71, 72 are disposed to the annular grooves. In such a way, an annular communication chamber 73, surrounded by the outer peripheral surface of the pressure adjustment screw 51, the inner peripheral surface of the small diameter hole 36 of the bonnet 10, and a pair of the seal members 71, 72, is formed. A communication hole 74 is formed to the pressure gauge guide 66. The inside of the pressure gauge 64 is in communication with the lower end portion of the insertion hole 57 via the communication hole 74. The insertion hole 57 is in communication with the annular communication chamber 73 via the lateral hole 70. The annular communication chamber 73 is in communication with the feedback chamber 20 via a communication passage 76 of the bonnet 10 and a communication passage 75 of the valve body 11. The feedback chamber 20 is in communication with the inside of the pressure gauge 64 via an introduction communication passage including the communication passages 75, 76, annular communication chamber 73, lateral hole 70, insertion hole 57, and communication hole 74.

As shown in FIGS. 1 to 3, a pointer 86 and a scale plate 85 are disposed to the pressure gauge 64. Two pressure range indicators 87 are mounted so that they are movable along the outer periphery of the scale plate 85 to be held at a desired position. A window hole 90 is formed to the upper end portion of the handle 59 having the cylindrical portion. A pressure gauge cover 91 is detachably mounted to the window hole 90. Engagement members 94 and knobs 88, which have predetermined widths, are fixed to both sides of a transparent plate 92. Side views of the engagement members 94 are U-shaped. The transparent plate 92 is connected to insides of the engagement members 94. Upper walls of the knobs 88 are connected to outsides of the engagement members 94. Side walls are connected to outsides of the upper walls of the knobs 88. The window hole 90 on the upper end of the handle 59 is adapted to fit to the pressure gauge cover 91. The window hole 90 has a substantially circled hole fitted to the transparent plate 92, and notches which have a predetermined width and are fitted to the engagement members 94 and knobs 88. Engagement projection portions 93 (part of the upper end of the handle 59) are formed to outer positions of the notches. Engagement steps are formed inside the upper portions of the engagement projection portions 93 of the handle 59. Engagement step portions are formed outside upper portions of U-shaped outside portions of the engagement members 94 of the pressure gauge cover 91.

The outer walls of the knobs 88 of the pressure gauge cover 91 are gripped by fingers, the knobs 88 are inserted into the notches of the window hole 90, and the engagement members 94 are engaged with the engagement projection portions 93 of the handle 59. When the fingers are separated from the knobs, the engagement step portions of the engagement member 94 are engaged with the engagement step portions of the engagement projection portions 93 to hold the pressure gauge cover 91 at a mount position. When the pressure range indicator 87 is moved, the outer walls of the knobs 88 are gripped by the fingers and pressed to release the engagement between the engagement members 94 and the engagement projection portions 93. Then, the knobs 88 are taken out of the notches of the window hole 90 to separate the pressure gauge cover 91 from the window hole 90. The pressure range indicator 87 is exposed, so that the pressure range indicator 87 can be moved to a desired position by use of a tip of, e.g., a screwdriver. After that, the pressure gauge cover 91 is mounted to the window hole 90.

According to aspects of the present invention, the planet gear mechanism connects the handle, the pressure gauge, and the valve main body, and the pressure gauge does not rotate relative to the valve main body when the handle is rotated. Because the gears are always engaged with each other, the relative rotation between the pressure gauge and the valve main body is almost completely prevented by choosing the number of the gears of the planet gear mechanism, thus generating no vibration. Additionally, because the mount members of the related arts are not used, and an extremely small force acts on these gears, the planet gear mechanism can be produced using inexpensive gears, and thus its production cost can be reduced, compared to that of the related arts.

According to other aspects of the present invention, because the number of the seal members used for the rotation members, the seal members being part of the members which introduce the pressure in the feedback chamber to the pressure gauge, is reduced by two compared to that in the related arts, a force for manipulating the handle is reduced by half, the possibility of air leakage due to the seal members becomes small, and the cost is reduced. Additionally, because the handle can be rotated by a smaller force, the pressure reduction valve can be finely adjusted.

According to further aspects of the present invention, the window hole is formed to the upper end portion of the handle, the pressure gauge cover is detachably mounted to the window hole, and the pressure range indicator can be moved when the pressure gauge cover is detached. Therefore, the pressure range indicator can be moved by detaching the pressure gauge cover without taking out the pressure gauge from the handle.

What is claimed is:

1. A pressure regulator with gauge embedded handle:
wherein a valve chamber is disposed between a primary port and a secondary port in a valve main body, a main valve body in the valve chamber is biased by a valve spring toward a main valve seat, and biased away from the main valve seat by a pressure adjustment spring mounted between a feedback member and a pressure adjustment spring retainer, a pressure gauge is disposed in a handle having a cylindrical portion, and a feedback chamber disposed between the feedback member and the valve chamber is in communication with the pressure gauge via an introduction communication passage, and
wherein a pressure adjustment guide is connected to an inside of the handle so as not to rotate relative to the handle, a cylindrical portion of a pressure adjustment screw is fitted to a bottom center hole of the pressure adjustment guide so that the pressure adjustment guide and the pressure adjustment screw are connected to, but do not rotate relative to each other, a male screw portion of the pressure adjustment screw is threadably engaged with a female screw portion of the pressure adjustment spring retainer, a gear D is fixed to the pressure gauge guide connected to the pressure gauge, a gear A having the same axis as the gear D is fixed to the valve main body, a support shaft is rotatably inserted into an insertion hole at a non-center position of a bottom portion of the pressure adjustment guide, gears C, B are engaged with the gears D, A, and the pressure gauge does not rotate relative to the valve main body when the handle is rotated.

2. The pressure regulator according to claim 1, wherein, when the number of teeth of the gears A, B, C, D is $Z_A$, $Z_B$, $Z_C$, $Z_D$, respectively, a condition of $Z_A \cdot Z_C = Z_B \cdot Z_D$ is satisfied.

3. A pressure regulator with gauge embedded handle:
wherein a valve chamber is disposed between a primary port and a secondary port in a valve main body, a main valve body in the valve chamber is biased by a valve spring toward a main valve seat, and biased away from the main valve seat by a pressure adjustment spring mounted between a feedback member and a pressure adjustment spring retainer, a pressure gauge is disposed in a handle having a cylindrical portion, and a feedback chamber disposed between the feedback member and the valve chamber is in communication with the pressure gauge via an introduction communication passage, and
wherein a pressure adjustment guide is connected to an inside of the handle so that the pressure adjustment guide does not rotate relative to the handle, a cylindrical portion of a pressure adjustment screw is fitted to a bottom center hole of the pressure adjustment guide so that the pressure adjustment guide and the pressure adjustment screw are connected to, but do not rotate relative to each other, a male screw portion of the pressure adjustment screw is threadably engaged with a female screw portion of the pressure adjustment spring retainer, a pressure gauge guide is connected to the pressure gauge, a guide portion of the pressure gauge guide is rotatably inserted into an insertion hole of the pressure adjustment screw, a space between an outer periphery of the guide portion and an inner periphery of the insertion hole is airproofed by an O-ring, an inside of the pressure gauge is in communication with the insertion hole via communication hole of pressure gauge guide, a lateral hole is formed to the pressure adjustment screw, the lateral hole communicating between the insertion hole and an outer periphery of the pressure adjustment screw, a pair of seal members are disposed between the outer periphery of the pressure adjustment screw and an inner periphery of a small diameter hole of the valve main body, and spaced from each other in a lateral direction of the pressure adjustment screw to form an annular communication chamber, the insertion hole is in communication with the annular communication chamber via the lateral hole, and the annular communication chamber is in communication with the feedback chamber.

4. The pressure regulator according to claim 3, wherein two annular grooves are formed to the outer periphery of the pressure adjustment screw, and positioned laterally away from the lateral hole by a predetermined distance, and the seal members are disposed to the annular grooves.

5. The pressure regulator according to claim 1, wherein the guide portion of the pressure gauge is rotatably inserted into the insertion hole of the pressure adjustment screw, the inside of the pressure gauge is in communication with the insertion hole via the communication hole of the pressure gauge guide, a lateral hole is formed to the pressure adjustment screw, and communicates between the insertion hole and the outer periphery of the pressure adjustment screw,
a pair of seal members are disposed between the outer periphery of the pressure adjustment screw and an inner periphery of a small diameter hole of the valve main body, and spaced from each other in a lateral direction of the pressure adjustment screw to form an annular communication chamber, the insertion hole is in communication with the annular communication chamber via the lateral hole, and the annular communication chamber is in communication with the feedback chamber.

6. A pressure regulator with gauge embedded handle:

wherein a valve chamber is disposed between a primary port and a secondary port in a valve main body, a main valve body in the valve chamber is biased by a valve spring toward a main valve seat, and biased away from the main valve seat by a pressure adjustment spring mounted between a feedback member and a pressure adjustment spring retainer, a pressure gauge is disposed in a handle having a cylindrical portion, and a feedback chamber disposed between the feedback member and the valve chamber is in communication with the pressure gauge via an introduction communication passage, and wherein an indicator, a scale plate, and a pressure range indicator are disposed to the pressure gauge, the pressure range indicator is movably mounted to be held at a desired position, a window hole is formed to an upper end of the handle, a pressure gauge cover is detachably mounted to the window hole of the handle, and the pressure range indicator is movable when the pressure gauge cover is detached.

7. The pressure regulator according to claim 6, wherein engagement members and knobs having predetermined widths are fixed to both ends of a transparent plate of the pressure gauge cover, a hole to which the transparent plate is fixed and notches having predetermined width, to which the engagement members and the knobs are fixed are formed to the window hole of the upper end of the handle, the hole and the notches being adjacent to each other, engagement projection portions are formed to outer positions of the notches, engagement steps are formed inside upper portions of the engagement projection portions of the handle, and engagement step portions are formed outside upper portions of the engagement members of the pressure gauge.

* * * * *